United States Patent
Xie

(10) Patent No.: US 10,682,880 B2
(45) Date of Patent: Jun. 16, 2020

(54) 3D PEN CAPABLE OF FEEDING OUT DRAWING MATERIALS OF DIFFERENT COLORS SIMULTANEOUSLY

(71) Applicant: Fangli Xie, Guangzhou (CN)

(72) Inventor: Fangli Xie, Guangzhou (CN)

( * ) Notice: Subject to any disclaimer, the term of this patent is extended or adjusted under 35 U.S.C. 154(b) by 81 days.

(21) Appl. No.: 15/884,356

(22) Filed: Jan. 30, 2018

(65) Prior Publication Data

US 2019/0111725 A1   Apr. 18, 2019

(30) Foreign Application Priority Data

Oct. 12, 2017  (CN) ............... 2017 1 0952298
Oct. 12, 2017  (CN) ............... 2017 1 0952299

(51) Int. Cl.
| | |
|---|---|
| *B43K 8/22* | (2006.01) |
| *B29C 64/118* | (2017.01) |
| *B29C 64/393* | (2017.01) |
| *B29C 64/209* | (2017.01) |
| *B33Y 50/02* | (2015.01) |
| *B33Y 30/00* | (2015.01) |

(52) U.S. Cl.
CPC .............. *B43K 8/22* (2013.01); *B29C 64/118* (2017.08); *B29C 64/209* (2017.08); *B29C 64/393* (2017.08); *B33Y 30/00* (2014.12); *B33Y 50/02* (2014.12)

(58) Field of Classification Search
CPC ........ B43K 8/22; B29C 64/209; B29C 64/393
See application file for complete search history.

(56) References Cited

U.S. PATENT DOCUMENTS

| | | | | |
|---|---|---|---|---|
| 3,303,970 A | * | 2/1967 | Breslau ............... | B65D 83/202 222/134 |
| 4,634,305 A | * | 1/1987 | Herrnring ............. | B43K 5/189 401/151 |
| 5,121,329 A | * | 6/1992 | Crump .................... | B22F 3/115 700/119 |
| 10,391,693 B2 | * | 8/2019 | Bogue ................. | B29C 48/2528 |
| 2002/0136587 A1 | * | 9/2002 | Bramlett .................. | B43K 8/22 401/17 |
| 2008/0213030 A1 | * | 9/2008 | Lapstun ............... | B41J 2/17503 401/195 |
| 2008/0308178 A1 | * | 12/2008 | Foster ..................... | B44D 3/12 141/192 |
| 2014/0154347 A1 | * | 6/2014 | Dilworth ............... | B29C 64/106 425/87 |
| 2015/0021356 A1 | * | 1/2015 | Witchell .................. | G01F 1/42 222/23 |
| 2015/0116287 A1 | * | 4/2015 | Yeh ........................ | B43K 8/003 345/179 |

(Continued)

*Primary Examiner* — J C Jacyna

(57) ABSTRACT

A 3D pen capable of feeding out drawing materials of different colors simultaneously is provided having a shell, a control mechanism, several transmission mechanisms, several feeding mechanisms, and a nozzle; the shell and the control mechanism are connected with each other; the control mechanism comprises a micro-processor unit (MCU); the MCU is electrically connected with the transmission mechanisms; the transmission mechanisms are connected with the feeding mechanisms; the feeding mechanisms are connected with the nozzle. The nozzle has several feeding channels extending along a left end and a right end of the nozzle.

5 Claims, 3 Drawing Sheets

(56) References Cited

U.S. PATENT DOCUMENTS

| | | | | |
|---|---|---|---|---|
| 2015/0251357 A1* | 9/2015 | Jin | ......................... | G05B 15/02 |
| | | | | 700/119 |
| 2016/0185042 A1* | 6/2016 | Toh | ......................... | B29C 64/20 |
| | | | | 425/132 |
| 2018/0281281 A1* | 10/2018 | Xie | ....................... | B29C 64/321 |

* cited by examiner

3D PEN CAPABLE OF FEEDING OUT DRAWING MATERIALS OF DIFFERENT COLORS SIMULTANEOUSLY

BACKGROUND OF THE INVENTION

The present invention relates to the field of 3D printing, and more specifically relates to a 3D pen.

As 3D pens are more widely used nowadays, consumers' expectation for 3D pens are growing higher. Most of the 3D pens now available in the market can only extrude a single color drawing material. When there is a need for color change, the 3D pen has to be powered off and replaced with another drawing material before being powered on again to operate. Usually, creating a work product requires more than one color. Therefore, operators have to change the drawing materials of different colors frequently during the drawing process. Such a frequent change of drawing materials occupies much of an operator's time and lower his working efficiency, and it is so bothering that the operator may be affected of his creation of the work product.

In actual use, a work product may need a color which is a blend of different colors. Since the 3D pens of the prior art can only extrude a single color drawing material at one time, but cannot extrude drawing materials of different colors simultaneously, it is not possible for the prior art 3D pens to blend different colors and extrude a mixed color.

Therefore, the market requires a novel 3D pen capable of changing colors quickly to increase the operators' working efficiency as well as achieving the function of color blending.

BRIEF SUMMARY OF THE INVENTION

To fulfill the above objects, the present invention has the following technical solution:

A 3D pen capable of feeding out drawing materials of different colors simultaneously, comprising a shell and a power source disposed inside the shell, a control mechanism, transmission mechanisms, feeding mechanisms and a nozzle; the shell and the control mechanism are connected with each other; the control mechanism is electrically connected with the power source; the control mechanism is electrically connected also with the transmission mechanisms; the transmission mechanisms are connected with the feeding mechanisms by partially sleeving the feeding mechanisms; the feeding mechanisms are connected with the nozzle by being partially inserted into the nozzle.

The shell comprises an upper shell and a lower shell; the upper shell and the lower shell are fixedly connected with each other; the upper shell and the control mechanism is fixedly connected with each other; the lower shell and the nozzle are fixedly connected.

The upper shell is provided with several material inlet holes, a hole for the power source, a display window, a temperature adjustment button, a transmission control button, a switch button, and a speed adjustment button; the material inlet holes and the hole for the power source are disposed at a right end surface of the upper shell; the material inlet holes are positioned with respect to the hole for the power source being a center.

The control mechanism comprises a microprocessor control unit (MCU) of a main board, a display device, a transmission control device, a temperature adjustment device and a speed adjustment device; the display device, the transmission control device, the temperature adjustment device and the speed adjustment device are electrically connected with the MCU; the MCU is electrically connected with the hole for the power source and the transmission mechanisms.

There are several said transmission mechanisms; the transmission mechanisms are electrically connected with the MCU; the transmission mechanisms have identical structures.

Each of the transmission mechanisms has a worm gear motor and a worm gear motor supporting panel; the worm gear motor and the worm gear motor supporting panel are fixedly connected; the worm gear motor and the MCU are electrically connected; the worm gear motor supporting panel is connected with a corresponding feeding mechanism by partially sleeving the corresponding feeding mechanism.

There are several said feeding mechanisms; the feeding mechanisms have identical structures; a quantity of the feed mechanisms is the same as a quantity of the transmission mechanisms; the feeding mechanisms are connected with the transmission mechanisms respectively.

A nozzle of a 3D pen comprises a heater tip, a first installation seat and a second installation seat; the heater tip and the first installation seat are fixedly connected with each other by insertion; the first installation seat and the second installation seat are fixedly connected with each other by insertion; wherein an outer wall of the heater tip has a recessed portion provided with a winding portion for installation of a heating device; a right end of the heater tip is provided with a third insertion portion; the third insertion portion is connected with the first installation seat by insertion; at least three feeding channels independent of one another are provided inside the heater tip; two ends of each of the feeding channels extend to a left end surface and a right end surface of the heater head respectively.

A pen tip is also provided; the pen tip sleeves a front end of a heater tip.

A left end of the first installation seat is provided with a first sleeving portion; the third insertion portion of the heater tip is connected with the first sleeving portion of the first installation seat by insertion.

A right end of the first installation seat is provided with a first insertion portion; the first insertion portion is connected with the second installation seat by insertion.

At least three first connection channels independent of one another are provided inside the first installation seat; two ends of each of the first connection channels extend to a left end surface and a right end surface of the first installation seat respectively.

A right end of the second installation seat is provided with a second insertion portion; the first insertion portion of the first installation seat is connected with the second sleeving portion of the second installation seat by insertion.

At least three second connection channels independent of one another are provided inside the second installation seat; two ends of each of the second connection channels extend to a left end surface and a right end surface of the second installation seat respectively.

The first connection channels of the first installation seat are in communication with the second connection channels of the second installation seat respectively.

The present invention has the following beneficial effects: The present invention enables users to install all the required drawing materials into the 3D pen all at the same time before starting to draw. When it is necessary to change color, it is only required to press the control button to extrude the material having the desired color and there is no need to power off the pen and restart it again. Therefore, operating time is saved and the working efficiency of the user is increased. Since it is not required to change drawing materials, users may not be so bothered so that they can be more focused on their creation.

A nozzle of the 3D pen is also given. The feeding channels can feed materials at the same time, and the materials gathered in the pen tip will be mixed in the pen tip to attain evenly blended color. By using the three primary colors, the desired colors of the work product can be created. In other words, By outputting the three primary colors (red, green and blue) at different outputting speed, the three primary colors are mixed according to determined ratio to attain a desired mixed color for the work product, and then the pen will extrude this mixed color. By saving complicated procedures, the passion of the user for creating work products can be significantly elevated.

BRIEF DESCRIPTION OF THE DRAWINGS

The present invention is further described in detail below with reference to the drawings. However, the drawings do not constitute any limitation to the present invention.

Figure 1:
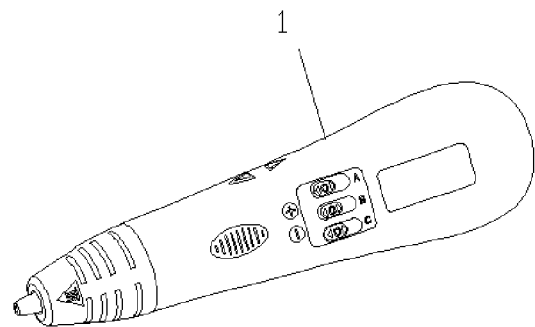
FIG. 1 is a front perspective view showing a structure of a 3D pen capable of feeding out drawing materials of different colors simultaneously according to the present invention.
Figure 2:
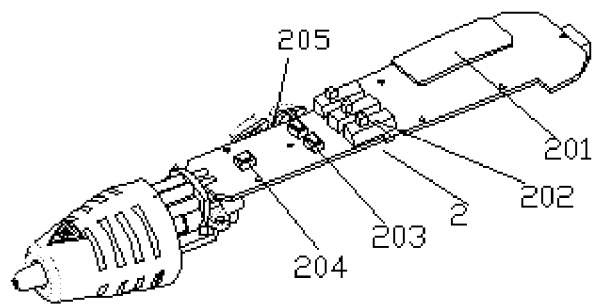
FIG. 2 is a front perspective view showing an internal structure of the 3D pen capable of feeding out drawing materials of different colors simultaneously according to the present invention.
Figure 3:
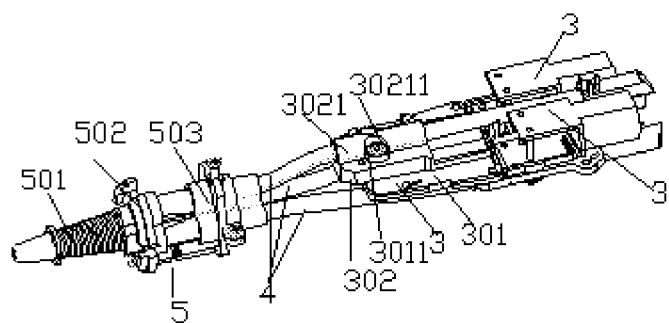
FIG. 3 is a rear perspective view showing the internal structure of the 3D pen capable of feeding out drawing materials of different colors simultaneously according to the present invention.
Figure 4:
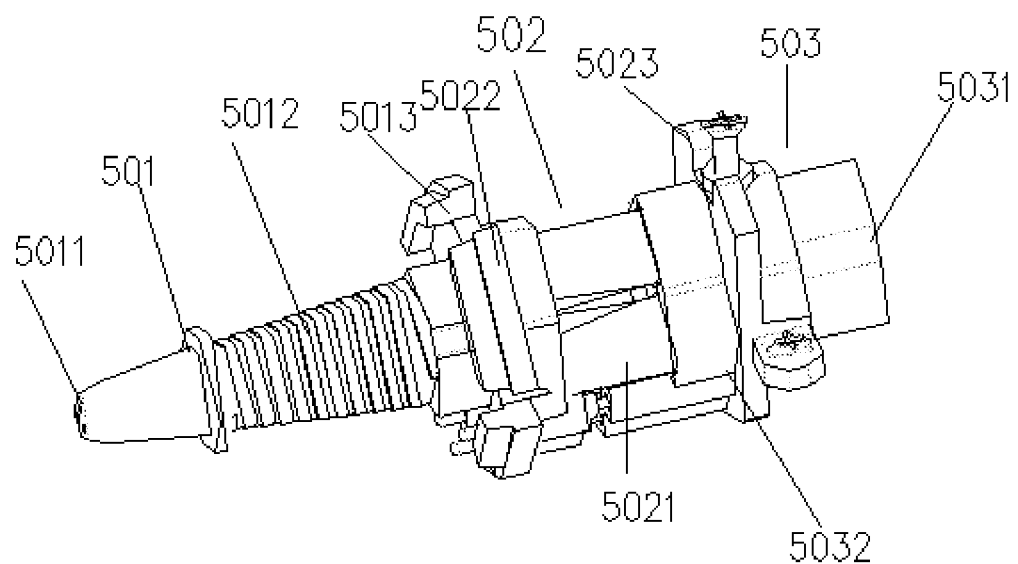
FIG. 4 is a structural view of a nozzle of the 3D pen of the present invention.
Figure 5:
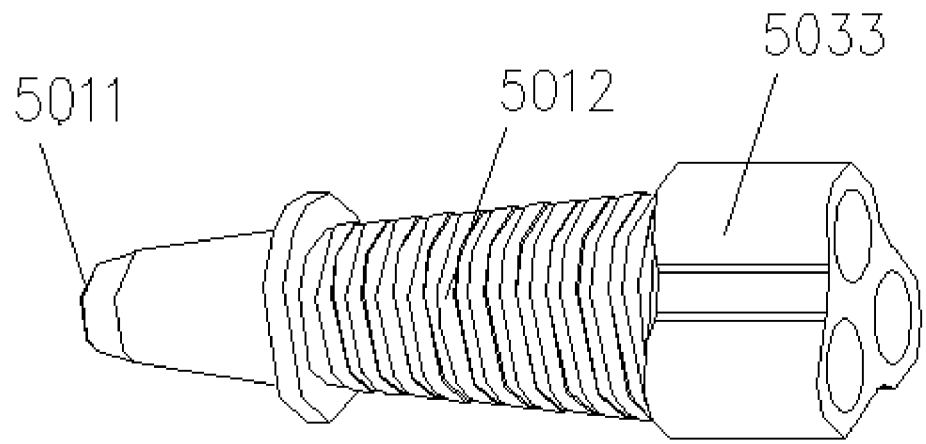
FIG. 5 is a schematic view of a heater tip of the nozzle of the 3D pen of the present invention.
Figure 6:
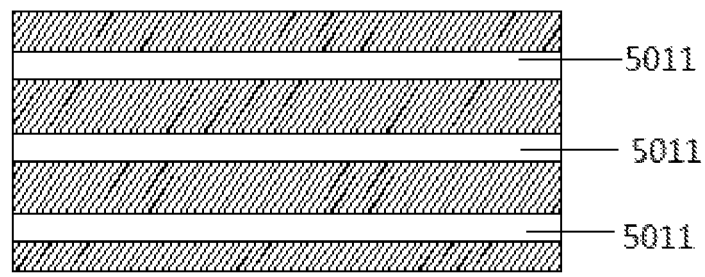
FIG. 6 is a sectional view of the heater tip of the nozzle of the 3D pen of the present invention.
Figure 7:
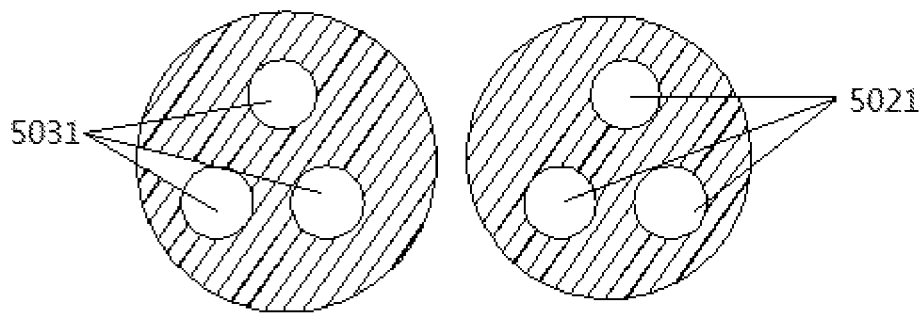
FIG. 7 is the sectional views of the first installation seat and the second installation seat of the nozzle of the 3D pen of the present invention.

REFERENCE SIGNS IN THE FIGURES 1-shell, 2-control mechanism, 201-MCU of a main board, 202-display device, 203-transmission control device, 204-temperature control device, 205-speed adjustment device, 3-transmission mechanisms, 301-worm gear motor, 3011-worm, 302-worm gear motor supporting panel, 3021-sleeve portion, 30211-trough, 4-feeding mechanisms, 5-nozzle, 501-heater tip, 502-first installation seat, 503-second installation seat, 5011-first feeding channels, 5012-winding portion, 5013-third insertion portion, 5021-first connection channels, 5022-first sleeving portion, 5023-first insertion portion, 5031-second connection channels, 5032-second sleeving portion, 5033-second insertion portion, 504-pen tip

DETAILED DESCRIPTION OF THE INVENTION

The present invention is described further in detail below with reference to the drawings. All directional references described below are based on the position of the present invention shown in FIG. 1.

As shown in FIGS. 1-8, a 3D pen capable of changing colors quickly comprises a shell 1 and a power source disposed inside the shell 1, a control mechanism 2, transmission mechanisms 3, feeding mechanisms 4, a nozzle 5 and a pen tip 504; the shell 1 and the control mechanism 2 are connected with each other; the control mechanism 2 is electrically connected with the power source; the control mechanism 2 is electrically connected also with the transmission mechanisms 3; the transmission mechanisms 3 are connected with the feeding mechanisms 4 by partially sleeving the feeding mechanisms; the feeding mechanisms 4 are connected with the nozzle 5 by being partially inserted into the nozzle 5; the pen tip is connected with the nozzle 5 by partially sleeving the nozzle 5.

The shell 1 comprises an upper shell and a lower shell; the upper shell and the lower shell are connected with each other by insertion; the upper shell and the control mechanism 2 is connected with the control mechanism by buckling; the lower shell and the nozzle 5 are fixedly connected; the upper shell and the lower shell together form a closed pen shaft for grabbing while leaving a cavity inside to accommodate the nozzle 5, the power source, the control mechanism 2, the transmission mechanisms 3 and the feeding mechanisms 4.

The upper shell has a front surface and a back surface; the upper shell is provided with three material inlet holes, a hole for the power source, a display window, a temperature adjustment button, a transmission control button, a switch button, and a speed adjustment button; the three material inlet holes and the hole for the power source are disposed at a right end surface of the upper shell; the three material inlet holes are positioned with respect to the hole for the power source being a center to facilitate material inlet and battery recharge; the display window, the temperature adjustment button, the transmission control button, the switch button, and the speed adjustment button are arranged sequentially from top to bottom along a middle section of the front surface of the upper shell. The upper shell is a prior art and hence will not be described here in detail.

The lower shell is an integral hollowed structure to facilitate dissipation of heat produced by the heater tip so that the 3D pen can have a longer service life. The lower shell is also a prior art and hence will not be described here in detail.

The control mechanism 2 comprises a microprocessor control unit (MCU) 201 of a main board, a display device 202, a transmission control device 203, a temperature adjustment device 204 and a speed adjustment device 205; the display device 202, the transmission control device 203, the temperature adjustment device 204 and the speed adjustment device 205 are electrically connected with the MCU 201; the MCU201 is electrically connected with the hole for the power source and the transmission mechanisms; the MCU201, the display device 202, the transmission control device 203, the temperature adjustment device 204 and the speed adjustment device 205 are prior arts and hence will not be described here in detail.

There are three said transmission mechanisms 3; the three transmission mechanisms 3 are electrically connected with the MCU201; the three transmission mechanisms 3 have identical structures. Each of the transmission mechanisms 3 has a worm gear motor 301 and a worm gear motor supporting panel 302; the worm gear motor 301 and the worm gear motor supporting panel 302 are fixedly connected; the worm gear motor 301 and the MCU201 are electrically connected; the worm gear motor supporting panel 302 is connected with a corresponding feeding mechanism 4 by partially sleeving the corresponding feeding mechanism 4.

The worm gear motor 301 comprises a worm 3011 rotably connected with a corresponding feeding mechanism 4. The worm gear motor is a prior art and hence will not be described here in detail.

The worm gear motor supporting panel 302 comprises a sleeve portion 3021 having a cylindrical shape; the sleeve portion 3021 comprises a trough 30211; the worm passes through the trough 30211 to be rotably connected with the corresponding feeding mechanism 4; the worm 3011 controls a speed of the corresponding feeding mechanism 4.

There are three of said feeding mechanisms 4. The three feeding mechanisms 4 are connected with the three transmission mechanisms 3 respectively; the three feeding mechanisms 4 have identical structures; each of the feeding mechanisms 4 comprises an upper guiding tube and a lower guiding tube; the upper guiding tube and the lower guiding tube are in communication with each other; the upper guiding tube and the lower guiding tube are partially inserted into a respective sleeve portion 3021 to be rotably connected with a respective worm 3011.

The nozzle 5 comprises a heater tip 501, a first installation seat 502 and a second installation seat 503; the heater tip 501 and the first installation seat 502 are fixedly connected by insertion; the first installation seat 502 and the second installation seat 503 are fixedly connected with each other by insertion.

First feeding channels independent of one another are provided inside the heater tip 501; a quantity of the first feeding channels is three; two ends of each of the first feeding channels extend to a left end surface and a right end surface of the heater tip 501 respectively; an outer wall of the heater tip 501 has a recessed portion provided with a winding portion for installation of a heating device (heating wire); a right end of the heater tip 501 is provided with a third insertion portion.

First connection channels independent of one another are provided inside the first installation seat 502; a quantity of the first connection channels is three; two ends of each of the first connection channels extend to a left end surface and a right end surface of the first installation seat 502 respectively; a left end of the first installation seat is provided with a first sleeving portion; a right end of the first installation seat is provided with a first insertion portion; the third insertion portion of the heater tip 501 is fixedly connected with the first sleeving portion of the first installation seat 502 by insertion, so that the three first feeding channels of the heater tip 501 are in communication with the three first connection channels of the first installation seat 502 respectively.

Second connection channels independent of one another are provided inside the second installation seat 503; a quantity of the second connection channels is three; two ends of each of the second connection channels extend to a left end surface and a right end surface of the second installation seat 503 respectively; a left end of the second installation seat 503 is provided with a second sleeving portion; a right end of the second installation seat 503 is provided with a second insertion portion; the first insertion portion of the first installation seat 502 is fixedly connected with the second sleeving portion of the second installation seat 503 by insertion, so that the three first connection channels of the first installation seat 502 are in communication with the three second connection channels of the second installation seat 503 respectively; the second insertion portion of the second installation seat 503 is connected with the feeding mechanisms by partially sleeving the feeding mechanisms.

The pen tip has a conical shape; a larger end of the pen tip sleeves a front end of the heater tip 501. The three first feeding channels independent of one another inside the heater tip 501 extrude materials of three different colors, and the three different colors are mixed and blended evenly inside the pen tip before feeding out to draw a 3D object. The 3D object can be drawn with the colors desired by mixing and blending the three primary colors into different desired colors.

A nozzle of a 3D pen capable of feeding out drawing materials of different colors simultaneously comprises a heater tip 501, a first installation seat 502, a second installation seat 503 and a pen tip 504; the nozzle 5 and the first installation seat 502 are fixedly connected with each other by insertion; the first installation seat 502 and the second installation seat 503 are fixedly connected with each other by insertion.

First feeding channels 5011 independent of one another are provided inside the nozzle 5; a quantity of the first feeding channels 5011 is three; two ends of each of the first feeding channels extend to a left end surface and a right end surface of the nozzle 5 respectively; an outer wall of the heater tip 501 has a recessed portion provided with a winding portion 5012 for installation of a heating device (heating wire); a right end of the nozzle 5 is provided with a third insertion portion 5013.

First connection channels 5021 independent of one another are provided inside the first installation seat 502; a quantity of the first connection channels is three; two ends of each of the first connection channels 5021 extend to a left end surface and a right end surface of the first installation seat 502 respectively; a left end of the first installation seat 502 is provided with a first sleeving portion 5022; a right end of the first installation seat 502 is provided with a first insertion portion 5023; the third insertion portion 5013 of the heater tip 501 is fixedly connected with the first sleeving portion 5022 of the first installation seat 502 by insertion, so that the three first feeding channels 5011 of the heater tip 501 are in communication with the three first connection channels 5021 of the first installation seat 502 respectively.

Second connection channels 5031 independent of one another are provided inside the second installation seat 503; a quantity of the second connection channels 5031 is three; two ends of each of the second connection channels 5031 extend to a left end surface and a right end surface of the second installation seat 503 respectively; a left end of the second installation seat 503 is provided with a second sleeving portion 5032; a right end of the second installation seat 503 is provided with a second insertion portion 5033; the first insertion portion 5022 of the first installation seat 502 is fixedly connected with the second sleeving portion 5031 of the second installation seat 503 by insertion, so that the three first connection channels 5021 of the first installation seat 502 are in communication with the three second connection channels 5031 of the second installation seat 503 respectively; the second insertion portion of the second installation seat 503 is connected with other structures of the 3D pen.

Figure 8:
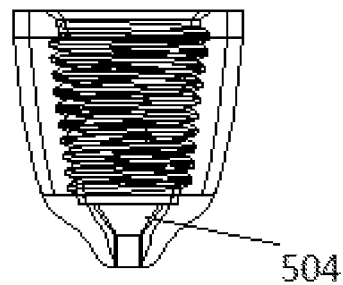
FIG. 8 is a structural view of another nozzle according to the 3D pen of the present invention.

FIG. 8 shows a pen tip 504 sleeving a front end of the heater tip. By using the pen tip 504, the drawing materials coming out from the three feeding channels are mixed and blended inside the pen tip to create desired colors for drawing.

The above detailed and specific description only shows some embodiments of the present invention. The above description should not be understood as limiting the scope of the present invention. It should be noted that, a person skilled in this field of art may carry out various changes and modifications without deviating from the inventive concept of the present invention, and all these changes and modifications should fall within the scope of protection of the present invention. The scope of protection of the present invention is defined by the appended claims.

What is claimed is:

1. A 3D pen capable of feeding out drawing materials of different colors simultaneously, comprising a shell, and a control mechanism, transmission mechanisms, feeding mechanisms disposed inside the shell, and a nozzle; the shell and the control mechanism are connected with each other; the control mechanism comprises a micro-processor unit (MCU) of a main board; the MCU is electrically connected with the transmission mechanisms; the transmission mechanisms are connected with the feeding mechanisms by partially sleeving the feeding mechanisms; the feeding mechanisms are connected with the nozzle by being partially inserted into the nozzle: the shell comprises an upper shell and a lower shell; the upper shell is provided with several material inlet holes, a hole for the power source, a display window, a temperature adjustment button, a transmission control button, a switch button, and a speed adjustment button; the material inlet holes and the hole for the power source are disposed at a right end surface of the upper shell; the material inlet holes are positioned with respect to the hole for the power source being a center.

2. The 3D pen of claim 1, wherein the control mechanism also comprises a display device, a transmission control device, a temperature adjustment device and a speed adjustment device; the display device, the transmission control device, the temperature adjustment device and the speed adjustment device are electrically connected with the MCU; the MCU is electrically connected with the hole for the power source and the transmission mechanisms.

3. The 3D pen of claim 1, wherein there are several said transmission mechanisms; the transmission mechanisms are electrically connected with the MCU; the transmission mechanisms have identical structures.

4. The 3D pen of claim 3, wherein each of the transmission mechanisms has a worm gear motor and a worm gear motor supporting panel; the worm gear motor and the worm gear motor supporting panel are fixedly connected; the worm gear motor and the MCU are electrically connected; the worm gear motor supporting panel is connected with a corresponding feeding mechanism by partially sleeving the corresponding feeding mechanism.

5. The 3D pen of claim 1, wherein there are several said feeding mechanisms; the feeding mechanisms have identical structures; a quantity of the feed mechanisms is the same as a quantity of the transmission mechanisms; the feeding mechanisms are connected with the transmission mechanisms respectively.

* * * * *